United States Patent
Abe et al.

(10) Patent No.: US 6,784,403 B2
(45) Date of Patent: Aug. 31, 2004

(54) CAR CIGARETTE LIGHTER

(75) Inventors: Kenichi Abe, Aichi (JP); Tetsuo Yamamoto, Aichi (JP); Kenji Nakatani, Hiroshima-ken (JP); Hiroshi Fujimoto, Hiroshima-ken (JP); Hiroharu Tsutaki, Hiroshima-ken (JP); Hiroshi Miyazaki, Hiroshima-ken (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 54 days.

(21) Appl. No.: 10/353,833

(22) Filed: Jan. 28, 2003

(65) Prior Publication Data

US 2003/0155342 A1 Aug. 21, 2003

(30) Foreign Application Priority Data

Feb. 5, 2002 (JP) ........................................ 2002-027673

(51) Int. Cl.[7] ................................................ F23Q 7/22
(52) U.S. Cl. ........................ 219/267; 219/268; 219/270
(58) Field of Search ................................. 219/267, 268, 219/269, 270, 265, 240, 241, 262; 439/668; 362/109, 32

(56) References Cited

U.S. PATENT DOCUMENTS

| | | | |
|---|---|---|---|
| 3,892,944 A | * | 7/1975 | Horwitt et al. .............. 219/270 |
| 4,713,733 A | * | 12/1987 | Fitz et al. .................... 362/489 |
| 5,710,406 A | * | 1/1998 | Garris et al. ................. 219/267 |
| 6,476,359 B2 | * | 11/2002 | Rostan ........................ 219/265 |

FOREIGN PATENT DOCUMENTS

| | | | |
|---|---|---|---|
| EP | 000776785 A1 | * | 6/1997 |
| EP | 000849113 A1 | * | 6/1998 |

* cited by examiner

*Primary Examiner*—Edward K. Look
*Assistant Examiner*—Vinod D. Patel
(74) *Attorney, Agent, or Firm*—Sheridan Ross PC

(57) ABSTRACT

A car cigarette lighter includes a lighter main body, a cylindrical socket body, and a cylindrical case. The lighter main body is selectively inserted into the socket body. An ash disposal hole is formed in the socket body for discharging ash from inside the socket body to the outside of the socket body. The case covers the socket body. A discharge hole is formed in the case for discharging liquid from inside the case to the outside of the case. This prevents ash from being discharged outside the cigarette lighter and lets liquid that has entered inside the cigarette lighter, to be discharged outside.

12 Claims, 4 Drawing Sheets

CAR CIGARETTE LIGHTER

BACKGROUND OF THE INVENTION

The present invention relates to a car cigarette lighter used for vehicles, such as automobiles.

A typical car cigarette lighter has a cylindrical socket body into which a lighter main body is selectively inserted. A bimetal is located at the inner end of the socket body. When inserted in the socket body, the lighter main body engages with the bimetal. The bimetal deforms to open radially outward of the socket body in accordance with the temperature increase of an electric heater of the lighter main body. An escape hole is formed in the circumferential wall of the socket body to permit the deformation of the bimetal, so as to release the inserted lighter main body.

The escape hole needs to be larger than the outline of the bimetal. Therefore, the opening area of the escape hole is relatively large. Thus, when the lighter main body is returned to the socket body with ash attached to the electric heater, the ash falls out of the socket body through the escape hole. Further, if a conductive foreign object is left during manufacturing of the vehicle, the conductive foreign object might enter the socket body through the escape hole. In this case, if the bimetal, which serves as a contact terminal for supplying current to the electric heater, might contact the conductive foreign object, which causes a short-circuit or deformation of the bimetal.

To solve the above two problems, an outer case may be provided for covering the socket body to prevent ash from leaking outside the cigarette lighter and prevent foreign object from entering the cigarette lighter.

However, if an occupant accidentally drops drink in the vicinity of the cigarette lighter, the drink might enter the socket body. In this case, the drink that enters the socket body is collected inside the cigarette lighter due to the outer case. Particularly, a cup holder for supporting drink containers is usually located above the cigarette lighter in the vehicles nowadays. Therefore, the possibility that the liquid is collected in the cigarette lighter is high.

SUMMARY OF THE INVENTION

Accordingly, it is an objective of the present invention to provide a car cigarette lighter that prevents ash from being discharged outside the cigarette lighter and lets liquid, such as drink that has entered inside the cigarette lighter, to be discharged outside.

To achieve the above objective, the present invention provides a car cigarette lighter, which includes a lighter main body, a cylindrical socket body, and a cylindrical case. The lighter main body is selectively inserted into the cylindrical socket body. An ash disposal hole is formed in the cylindrical socket body for discharging ash from inside the cylindrical socket body to the outside of the cylindrical socket body. The cylindrical case covers the cylindrical socket body. A discharge hole is formed in the cylindrical case for discharging liquid from inside the cylindrical case to the outside of the cylindrical case.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to FIGS. 1 to 3.

Figure 1:
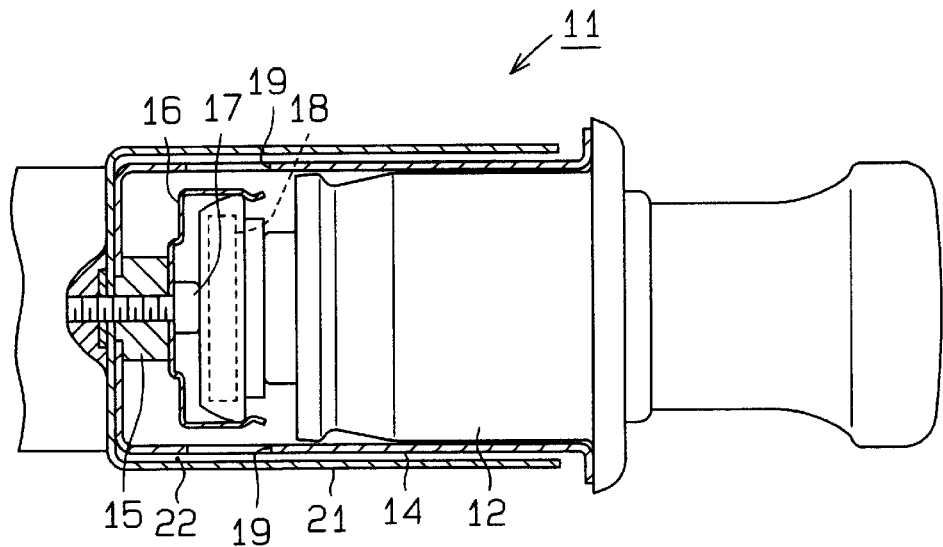
FIG. 1 is a cross-sectional view illustrating a car cigarette lighter according to one embodiment of the present invention.
Figure 2:
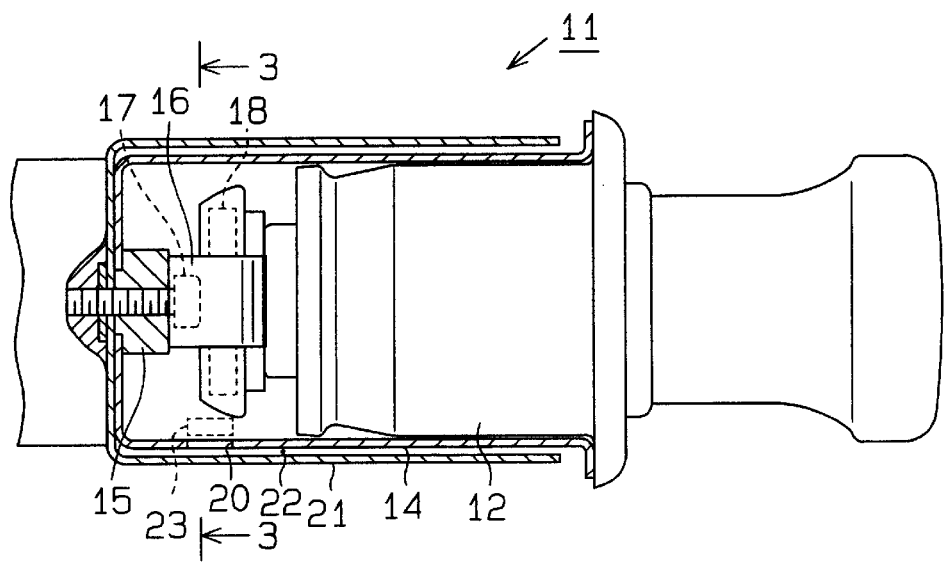
FIG. 2 is a cross-sectional view illustrating the cigarette lighter shown in FIG. 1.

FIGS. 1 and 2 show a car cigarette lighter 11, which has a socket body 14 and a case 21. A lighter main body 12 is inserted into the socket body 14. The case 21 covers the entire socket body 14. The lighter main body 12 has an electric heater 18, which selectively projects from the lighter main body 12. The socket body 14 is cylindrical and has an inner bottom. A bimetal 16 is secured to the inner bottom with a fixing screw 17 with a receiver 15 located in between. The bimetal 16 has a u-shaped cross-section. When the lighter main body 12 is inserted into the socket body 14, a distal end of the electric heater 18 engages with the bimetal 16. Both ends of the bimetal 16 deform to open radially outward of the socket body 14 in accordance with the temperature increase of the electric heater 18. As a result, the distal end of the lighter main body 12 disengages from the bimetal 16.

Two escape holes 19 are formed in the circumferential wall of the socket body 14 at portions corresponding to both ends of the bimetal 16 for permitting deformation of the bimetal 16. The escape holes 19 face each other in the radial direction of the socket body 14. Since the escape holes 19 are formed, both ends of the bimetal 16 do not interfere with the inner circumferential surface of the socket body 14 when the bimetal 16 is disengaged from the distal end of the electric heater 18.

Figure 3:
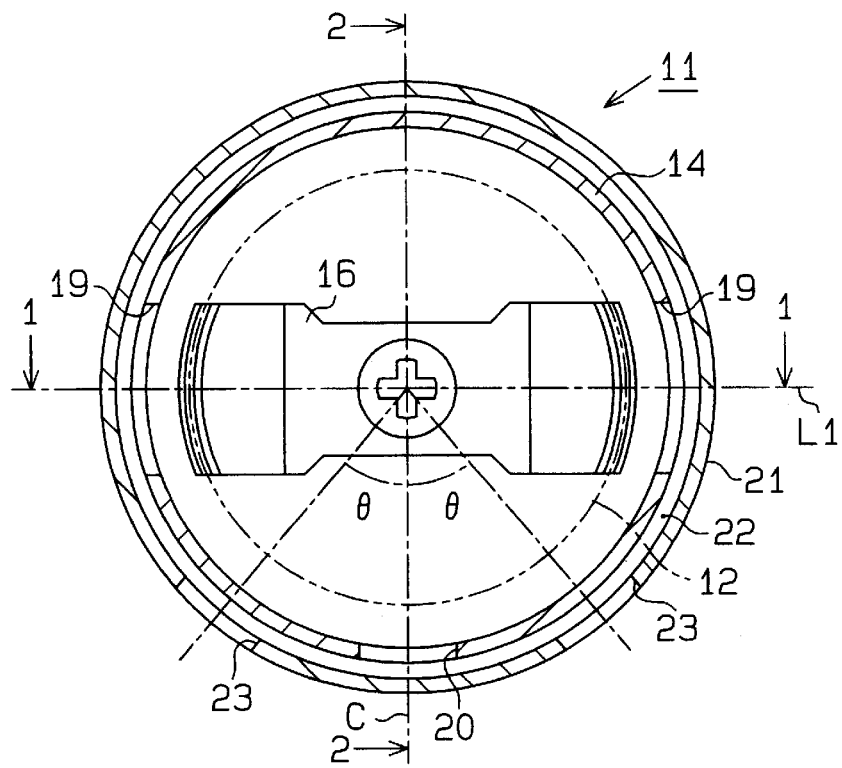
FIG. 3 is a cross-sectional view taken along line 3—3 in FIG. 2.

As shown in FIGS. 2 and 3, an ash disposal hole 20, for discharging the remaining ash in the socket body 14 to the outside the socket body 14, is formed on the circumferential wall of the socket body 14 in the vicinity of the electric heater 18 of the lighter main body 12. Ash that is attached to the electric heater 18 drops inside the socket body 14 when lighter main body 12 is returned to the socket body 14. Thus, to easily discharge the ash to the outside of the socket body 14, the ash disposal hole 20 is preferably formed in the vicinity of the electric heater 18 at the lower portion of the socket body 14. The lower portion of the socket body 14 corresponds to a portion lower than a horizontal surface L1, which lies along the axis of the socket body 14. The position of the ash disposal hole 20 need not be as mentioned above but may be modified as required.

The case 21 has a cylindrical shape, the diameter of the case 21 being greater than the socket body 14. A space 22 of a predetermined distance is formed between the socket body 14 and the case 21. The case 21 prevents ash that is discharged from the socket body 14 from falling outside the car cigarette lighter 11 and prevents a foreign object from entering the car cigarette lighter 11. In this case, the foreign object corresponds to a substance remained in the instrument panel during manufacturing of the vehicle.

Discharge holes 23 (two in this embodiment) are formed in the circumferential wall of the case 21 in the vicinity of the ash disposal hole 20 for discharging liquid, such as drink, to the outside of the car cigarette lighter 11. For example, if an occupant accidentally drops liquid such as drink, the drink might enter the socket body 14 and the case 21. Each discharge hole 23 is offset from the ash disposal hole 20 in the circumferential direction of the car cigarette lighter 11. More specifically, the discharge holes 23 are arranged at equal intervals of a predetermined angle θ in the circumferential direction of the cigarette lighter 11 with reference to a center line C, which extends through the ash disposal hole 20 (see FIG. 3). The position of the ash disposal hole 20 and the discharge holes 23 are the same in the axial direction of the car cigarette lighter 11.

As shown in FIG. 3, each discharge hole 23 is located closer to the horizontal surface L1 than the ash disposal hole 20 so that the liquid inside the car cigarette lighter 11 is easily discharged outside. That is, the discharge holes 23 are located slightly above the ash disposal hole 20. The position of the discharge holes 23 may be changed as required.

The preferred embodiment provides the following advantages.

The ash that is left in the socket body 14 is discharged from the ash disposal hole 20 and collected in the space 22 between the socket body 14 and the case 21. Therefore, the ash is prevented from being discharged outside the car cigarette lighter 11. In the case when drink enters the car cigarette lighter 11, liquid of the drink is discharged outside the socket body 14 from the ash disposal hole 20 and further discharged outside the case 21 from the discharge holes 23. As a result, the liquid in the car cigarette lighter 11 is reliably discharged outside.

The ash that is attached to the electric heater 18 easily enters the socket body 14 when the lighter main body 12 is returned to the socket body 14 after usage. However, when the lighter main body 12 is inserted in the socket body 14, the electric heater 18 that projects from the distal end of the lighter main body 12 is located close to the ash disposal hole 20. Therefore, the ash in the socket body 14 is easily discharged from the ash disposal hole 20.

The ash disposal hole 20 and the discharge holes 23 are offset in the circumferential direction of the car cigarette lighter 11. That is, the ash disposal hole 20 and the discharge holes 23 do not overlap in the circumferential direction of the car cigarette lighter 11. Therefore, the ash located in the space 22 between the socket body 14 and the case 21 is not easily discharged outside the car cigarette lighter 11 through the discharge holes 23.

It should be apparent to those skilled in the art that the present invention may be embodied in many other specific forms without departing from the spirit or scope of the invention. Particularly, it should be understood that the invention may be embodied in the following forms.

Two or more ash disposal holes 20 may be provided. Instead of providing several ash disposal holes 20, an ash disposal hole having a great opening area that extends in the circumferential direction of the socket body 14 may be formed.

Figure 4:
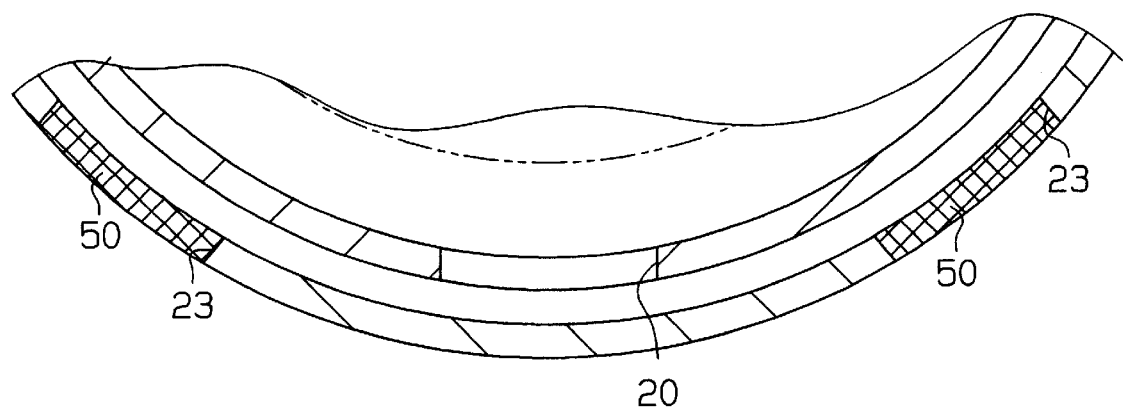
FIG. 4 is an enlarged partial cross-sectional view illustrating a car cigarette lighter according to a modified embodiment.

As shown in FIG. 4, the discharge holes 23 may be closed by mesh materials 50. In this case, the size of the mesh of the mesh material is desired to be set to a size such that only liquid is discharged.

Figure 5:
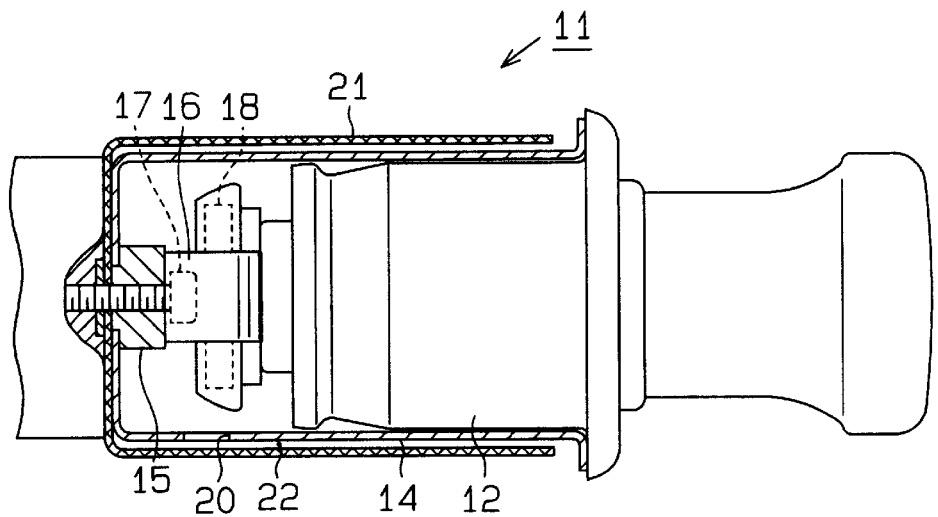
FIG. 5 is a cross-sectional view illustrating a car cigarette lighter according to another modified embodiment.

As shown in FIG. 5, the entire case 21 may be made of a mesh material and formed in into a cylindrical shape. The case 21 made of a mesh material has several meshes (the meshes correspond to discharge holes 23) that permit liquid through and prevents ash from passing through. With this structure, since the discharge holes 23 need not be formed, the manufacturing cost is reduced. Further, the mesh facilitates attaching the car cigarette lighter 11 to a mounting projection located inside the instrument panel.

Figure 6:
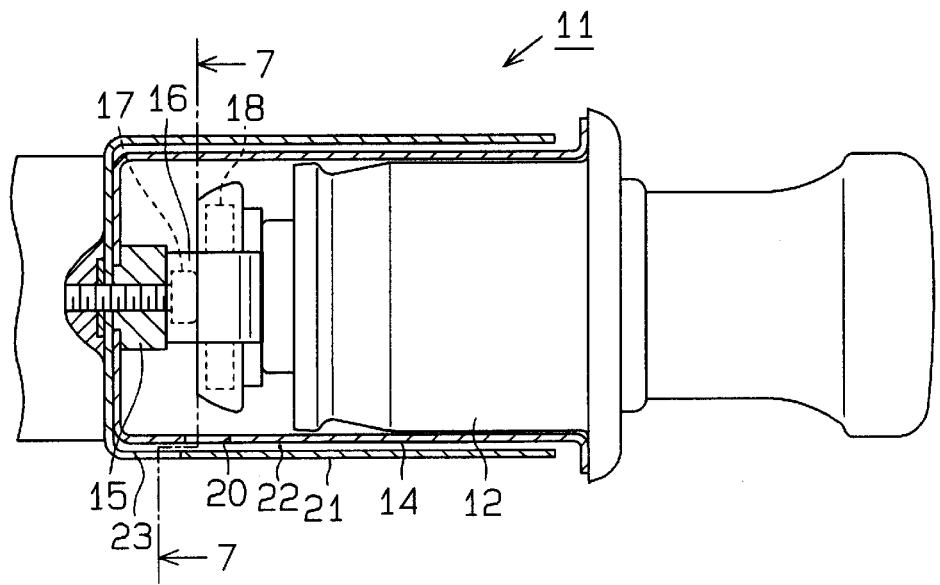
FIG. 6 is a cross-sectional view illustrating the car cigarette lighter according to another modified embodiment.
Figure 7:
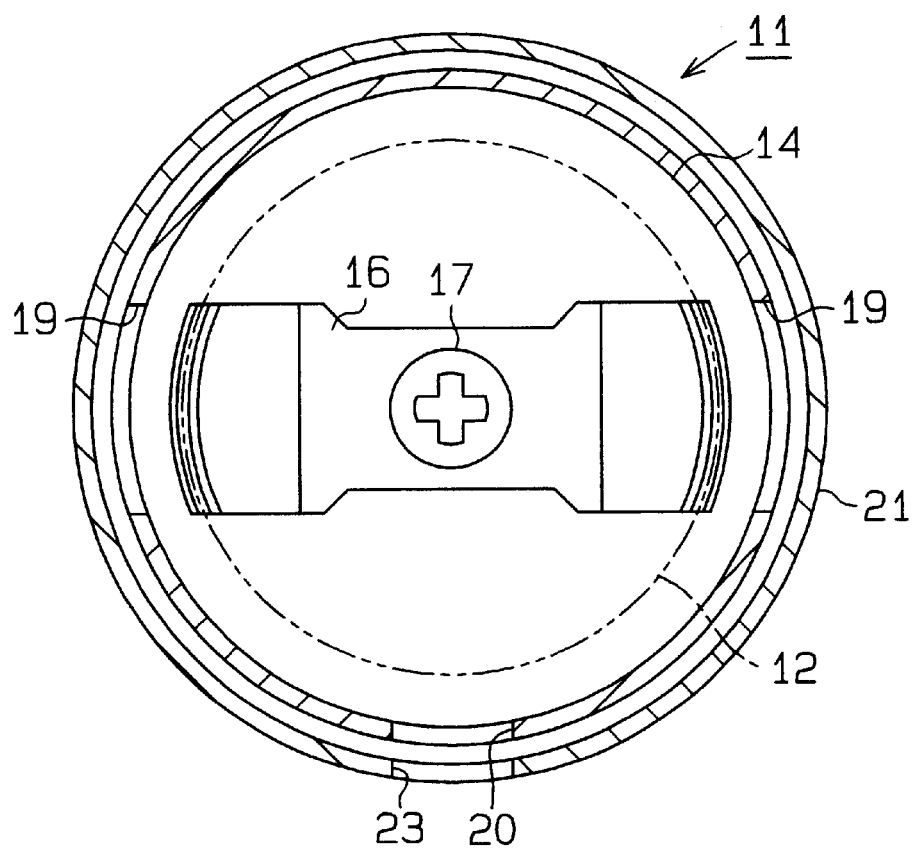
FIG. 7 is a cross-sectional view take along line 7—7 shown in FIG. 6.

As shown in FIGS. 6 and 7, the ash disposal hole 20 and the discharge holes 23 may be offset in the axial direction of the car cigarette lighter 11. In this case, the discharge holes 23 may be located in the axial direction of the car cigarette lighter 11. Further, a discharge hole that is elongated in the axial direction of the car cigarette lighter 11 may be formed. In FIGS. 6 and 7, the ash disposal hole 20 and the discharge holes 23 are located at the same position in the circumferential direction of the car cigarette lighter 11. However, the ash disposal hole 20 and the discharge holes 23 may be offset in the circumferential direction of the car cigarette lighter 11.

The number of the discharge holes 23 is not limited to two as long as there is more than one discharge hole 23.

Therefore, the present examples and embodiments are to be considered as illustrative and not restrictive and the invention is not to be limited to the details given herein, but may be modified within the scope and equivalence of the appended claims.

What is claimed is:

1. A car cigarette lighter comprising:
   a lighter main body;
   a cylindrical socket body into which the lighter main body is selectively inserted, wherein an ash disposal hole is formed in the cylindrical socket body for discharging ash from inside the cylindrical socket body to the outside of the cylindrical socket body; and
   a cylindrical case, which covers the cylindrical socket body, wherein a discharge hole is formed in the cylindrical case for discharging liquid from inside the cylindrical case to the outside of the cylindrical case.

2. The car cigarette lighter according to claim 1, wherein an electric heater is located at a distal end of the lighter main body, and wherein the position of the ash disposal hole in the axial direction of the cylindrical socket body is determined such that the electric heater is located in the vicinity of the ash disposal hole when the lighter main body is inserted in the cylindrical socket body.

3. The car cigarette lighter according to claim 1, wherein the ash disposal hole is offset with respect to the discharge hole.

4. The car cigarette lighter according to claim 1, wherein the ash disposal hole is offset with respect to the discharge hole in the circumferential direction of the cylindrical socket body.

5. The car cigarette lighter according to claim 1, wherein the ash disposal hole is offset with respect to the discharge hole in the axial direction of the cylindrical socket body.

6. The car cigarette lighter according to claim 3, wherein the discharge hole is located above the ash disposal hole.

7. The car cigarette lighter according to claim 3, wherein the discharge hole is located below the ash disposal hole.

8. The car cigarette lighter according to claim 1, wherein the discharge hole is closed by a mesh material, which permits liquid to pass through the discharge hole but does not permit ash to pass through the discharge hole.

9. The car cigarette lighter according to claim 1, wherein the cylindrical case accommodates ash that is discharged outside the cylindrical socket body through the ash disposal hole.

10. The car cigarette lighter according to claim 9, wherein the ash inside the cylindrical case cannot escape outside the cylindrical case through the discharge hole.

11. A car cigarette lighter comprising:

a lighter main body, wherein the lighter main body has an electric heater;

a cylindrical socket body into which the lighter main body is selectively inserted, wherein an ash disposal hole is formed in the cylindrical socket body for discharging ash from inside the cylindrical socket body to the outside of the cylindrical socket body; and a cylindrical case, which covers the cylindrical socket body, wherein a discharge hole is formed in the cylindrical case for discharging liquid from inside the cylindrical case to the outside of the cylindrical case, wherein the position of the ash disposal hole in the axial direction of the cylindrical socket body is determined such that the electric heater is located in the vicinity of the ash disposal hole when the lighter main body is inserted in the cylindrical socket body, and wherein the ash disposal hole is offset with respect to the discharge hole.

12. A car cigarette lighter comprising:

a lighter main body, wherein the lighter main body has an electric heater;

a cylindrical socket body into which the lighter main body is selectively inserted, wherein an ash disposal hole is formed in the cylindrical socket body for discharging ash from inside the cylindrical socket body to the outside of the cylindrical socket body; and a cylindrical case, which covers the cylindrical socket body, wherein a discharge hole is formed in the cylindrical case for discharging liquid from inside the cylindrical case to the outside of the cylindrical case, wherein the position of the ash disposal hole in the axial direction of the cylindrical socket body is determined such that the electric heater is located in the vicinity of the ash disposal hole when the lighter main body is inserted in the cylindrical socket body, and wherein the ash inside the cylindrical case cannot escape outside the cylindrical case through the discharge hole.

* * * * *